(12) United States Patent
Mehta

(10) Patent No.: US 8,643,452 B2
(45) Date of Patent: Feb. 4, 2014

(54) SOLENOID HOUSING WITH ELONGATED CENTER POLE

(75) Inventor: Shreyas R. Mehta, Scarsdale, NY (US)

(73) Assignee: Indimet Inc., White Plains, NY (US)

( * ) Notice: Subject to any disclaimer, the term of this patent is extended or adjusted under 35 U.S.C. 154(b) by 0 days.

(21) Appl. No.: 13/439,409

(22) Filed: Apr. 4, 2012

(65) Prior Publication Data

US 2012/0256716 A1 Oct. 11, 2012

Related U.S. Application Data

(60) Provisional application No. 61/472,844, filed on Apr. 7, 2011.

(51) Int. Cl.
*H01F 3/00* (2006.01)

(52) U.S. Cl.
USPC .......................................... 335/297

(58) Field of Classification Search
USPC ................................. 335/220–229, 296–299; 251/129.15–129.22
See application file for complete search history.

(56) References Cited

U.S. PATENT DOCUMENTS

| | | | | |
|---|---|---|---|---|
| 4,604,600 A | * | 8/1986 | Clark | 335/261 |
| 5,779,220 A | * | 7/1998 | Nehl et al. | 335/297 |
| 5,986,530 A | * | 11/1999 | Nippert et al. | 335/289 |
| 6,615,780 B1 | * | 9/2003 | Lin et al. | 335/220 |
| 2002/0057153 A1 | * | 5/2002 | Matsusaka et al. | 335/220 |

* cited by examiner

*Primary Examiner* — Bernard Rojas
(74) *Attorney, Agent, or Firm* — IP Attorneys Group, LLC

(57) ABSTRACT

The invention relates to a solenoid housing having an elongated center pole comprising a non-magnetic region thereon for allowing actuation of an armature in response to electric current and a method of the making said solenoid housing. The instant invention eliminates the need for a two-piece construction of the center pole, leading to a simplified fabrication process, increased performance of product solenoid housing, and increased operational lifetimes as well.

19 Claims, 11 Drawing Sheets

SOLENOID HOUSING WITH ELONGATED CENTER POLE

CROSS REFERENCE TO RELATED APPLICATIONS

This application claims priority to U.S. Provisional Patent Application Ser. No. 61/472,844 filed on Apr. 7, 2011. The contents of the above-identified Application are relied upon and incorporated herein by reference in their entirety.

FIELD OF INVENTION

The invention relates to a solenoid housing with an elongated center pole having a region of differing magnetic properties than the rest of the housing and a method of making the same.

BACKGROUND OF INVENTION

Solenoids typically make use of a high magnetic reluctance region to facilitate movement of an armature in response to the application of an electric current. This region can be referred to as an "air gap" because empty space is commonly used as the high magnetic reluctance region. Such an arrangement, however, may lead to certain difficulties in both construction and operation of the solenoid. Certain prior art teachings disclose the air gap may be achieved through a two piece construction of the solenoid with a gap left between the two pieces. Each piece may have a different conformation, meaning that separate, specialized manufacturing processes could be required for each piece. Further, if the two pieces need to be aligned properly to allow for easy movement of the armature through each piece and across the air gap, extra calibration and alignment procedures may be necessary. All of these additional steps generally increase manufacturing complexity, meaning more time and cost may be necessary to produce a single solenoid than if said extra calibration and alignment procedures were eliminated.

There is the fear of decreased manufacturing efficiency and operational lifetimes associated with prior art solenoids. For example, if a solenoid were produced in a two-piece arrangement with a certain degree of allowed deviation from the ideal alignment of the first and second piece, solenoids may be produced outside of this tolerance, and the time and cost necessary to produce said solenoid would have been wasted. Further, since a two-part construction like the one described above may be unlikely to produce ideal alignments on a consistent basis, the average operation lifetimes of the solenoids may decrease, shortened by failures at weak points (such as welding seams) and by general wear and tear (caused by frictional forces of the armature on the solenoid housing after days, months, or years of repeated rubbing due to misaligned solenoid components).

What is desired, therefore, is a method of making a solenoid housing that eliminates the structural and fabrication complexity of the prior art. It is further desired that the method of providing a solenoid housing be finely tunable and precise, so that the product solenoid housing of the method allows for increased spatial efficiency of components in the product solenoid. Additionally, it is desired to produce a solenoid housing with an increased operational lifetime over the prior art.

SUMMARY OF INVENTION

It is therefore an object of this invention to provide a solenoid housing via a cold-forging method which decreases fabrication complexity while increasing operational performance of the product. It is a further object of the invention to provide a solenoid housing with a simplified, integral construction that can nonetheless be used in high-performance applications. It is yet another object of this invention to provide a solenoid housing consistent with the above objects which can be consistently made to exacting specifications to allow for enhanced operation lifetimes.

One embodiment of the instant invention is a solenoid housing comprising a center pole having a first diameter, a first region, a second region, and a third region between said first region and said second region, a center pole recess extending through at least a portion of the first region, a portion of the second region, and through all of the third region, wherein said third region of said center pole includes a magnetic property different than a magnetic property of at least said first region or said second region. In another embodiment, the solenoid housing of the instant invention further comprises a raised perimeter having a first diameter around said center pole having a second diameter, wherein said first diameter is larger than said second diameter. In other embodiments of the instant invention, the third region comprises Aluminum-bronze or is perforated. In one embodiment, the instant invention further comprises a valve having a valve recess, said valve recess being proximate to the center pole recess.

Another embodiment of the instant invention is a method of making a solenoid housing consistent with the solenoid housing described above, comprising the steps of providing a cylinder having a first part and a second part, providing a region on the cylinder between the first part and the second part, differing a magnetic property of the region from at least said first part or said second part, compressing the second part of the cylinder in a direction toward the first part of cylinder to create a disk having a perimeter, raising the perimeter of the disk in a direction towards the first part of the cylinder, and providing a recess in the first part of the cylinder and extending the recess through the region. In another embodiment, the method of making the instant invention further comprises the step of reducing a diameter of the first part of the cylinder to be less than a diameter of the second part of the cylinder.

In a further embodiment, the step of providing a region having a magnetic property different from at least said first part or said second part comprises the step of providing at least one notch between the first part and the second part and filling said at least one notch with a non-magnetic material. In additional embodiments, the method of the instant invention further comprises the step of filling the at least one notch with Aluminum-Bronze and/or providing at least one perforation to the third part of the cylinder between the first part and the second part.

In one embodiment, the method of making a solenoid of the instant invention further comprises the step of magnetically annealing the solenoid housing, wherein said step of magnetically annealing the solenoid housing occurs after the step of raising the perimeter of the disk in a direction towards the first part of the cylinder. In another embodiment, the method further comprises the step of contacting said notch and said recess. In an additional embodiment, the step of raising the perimeter of the disk in a direction towards the first part of the cylinder is performed by compressing the second part of the cylinder towards the first part of the cylinder. In yet another embodiment, the method comprises the step of machining a single, continuous bore through the first part and the second part. In one embodiment, the method comprises the step of providing a valve having a recess, said recess of the valve being proximate to said recess of the solenoid housing.

In one embodiment, the method of providing a solenoid housing of the instant invention comprises the steps of providing a cylinder of malleable material having a first part and a second part, providing at least one notch having a depth, the notch being between the first part and the second part, filling said at least one notch with a non-magnetic material, compressing the second part of the cylinder in a direction toward the first part of cylinder to create a disk having a perimeter, raising the perimeter of the disk in a direction towards the first part of the cylinder, extending a recess in the first part of the cylinder through said first part and said second part, and contacting said at least one notch with said recess. In a further embodiment, the step of reducing a diameter of the first part of the cylinder to be less than a diameter of the second part of the cylinder. In another embodiment, the method further comprises the step of magnetically annealing the solenoid housing after the step of raising the perimeter of the disk in a direction towards the first part of the cylinder. In yet another embodiment of the method of making the instant invention, the step of filling said at least one notch with non-magnetic material comprises the step of creating a region with a reluctance that is higher than either the first part or the second part. In an additional embodiment, the method further comprises the step of providing a valve having a recess, said recess of the valve being proximate to said recess of the solenoid housing.

BRIEF DESCRIPTION OF FIGURES

The features of the invention believed to be novel and the elements characteristic of the invention are set forth with particularity in the claims. The figures are for illustration purposes only. The invention itself, however, both as to organization and method of operation, may be understood by reference to the detailed description which follows taken in conjunction with the accompanying drawings in which the drawings show typical embodiments of the invention and are not intended to be limited of its scope.

DETAILED DESCRIPTION OF DRAWINGS

In describing the various embodiments of the instant invention, reference will be made herein to FIGS. 1-11 in which like numerals refer to like features of the invention.

Figure 1:
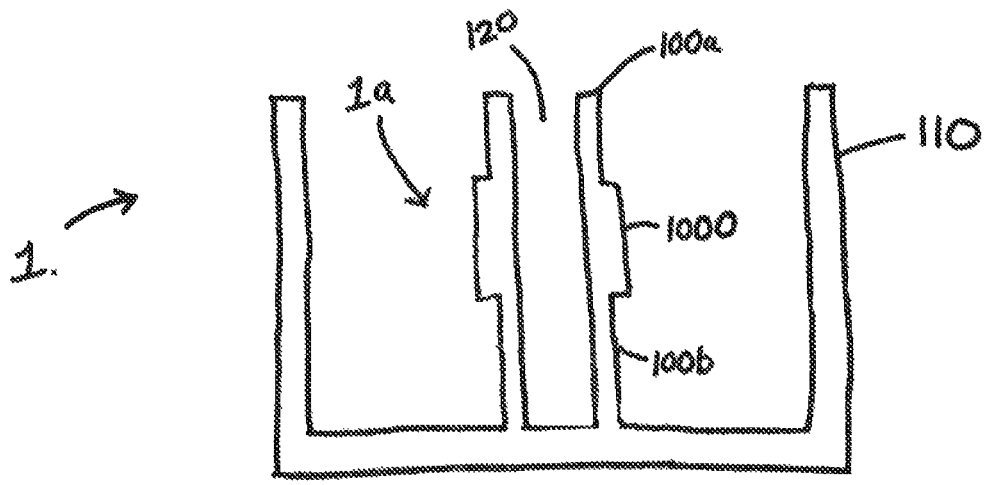
FIG. 1 depicts an embodiment of a solenoid housing with an elongated center pole of the instant invention.

FIG. 1 depicts an embodiment of a solenoid housing 1 of the instant invention for use with a solenoid comprising an elongated center pole 1a and an outer casing 110. The elongated center pole 1a is a cylinder of material comprising at least three separate regions: a first region 100a, a second region 100b, and a third region 1000. In one embodiment, the third region 1000 is composed of a material having a higher reluctance, or greater opposition to magnetic field flux, than that of either the first region 100a or the second region 100b. In another embodiment, the third region 1000 is composed of non-magnetic or substantially non-magnetic material. By fashioning the third region 1000 in this manner, the magnetic field in the third region 1000 will saturate faster than the magnetic field in either the first region 100a or the second region 100b in response to an electric current applied to the solenoid (not pictured).

Figure 1A:
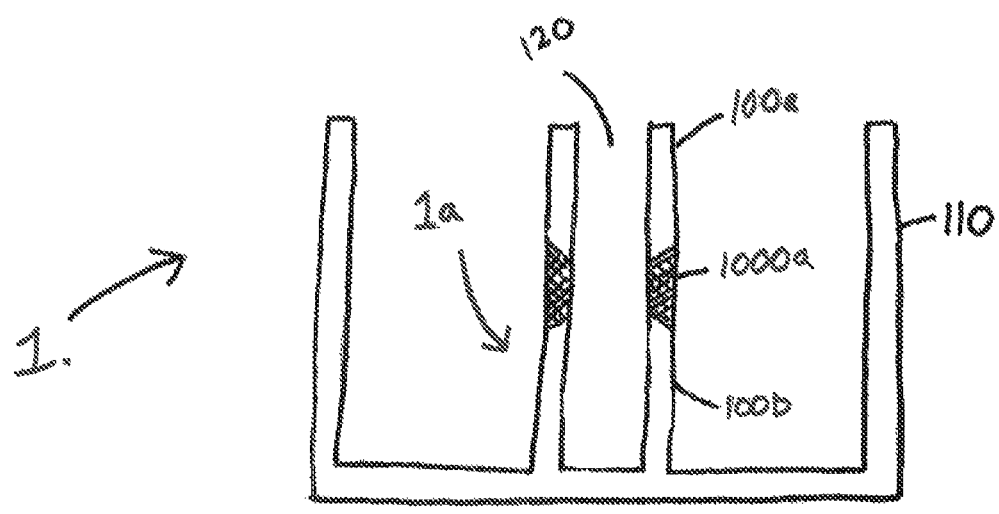
FIG. 1A depicts another embodiment of the solenoid housing with an elongated center pole as shown in FIG. 1.

In one embodiment, such as that portrayed in FIG. 1A, the third region is a notch 1000a and is filled with a non-magnetic material. In a further embodiment, the notch 1000a is filled with Aluminum-Bronze. The advantage of Aluminum-Bronze is its combination of non-magnetic properties and high melting point. In embodiments where the solenoid housing will undergo a magnetic annealing step, the high melting point becomes beneficial. In one embodiment, magnetically annealing the solenoid housing requires that the solenoid housing be heated to temperatures above the Curie temperature of the material, or above the temperature at which a material becomes paramagnetic. Temperatures can reach upwards of approximately 800 degrees Celsius during these magnetic annealing steps. With a melting point of approximately 1,200 degrees Celsius, Aluminum Bronze allows for fabrication of the notch 1000a before the magnetic annealing step and eliminates any worry of melting or distorting the notch 1000a during said annealing step. This scheme simplifies the fabrication process, as is discussed below.

In one embodiment, the elongated center pole 1a comprises a recess 120. The form of recess 120, including the length, diameter, and shape, are chosen such that an armature freely slides through said recess and access the first region 100a, the second region 100b, and the third region 1000. In a further embodiment, the recess is generally cylindrical in shape. The recess provides a guide through which an armature will be actuated in response to an electric current applied to the solenoid. In one embodiment, electric current applied to the solenoid produces a magnetic field along the solenoid housing 1a. The magnetic field in the third region 1000 saturates much quicker than that of either the first region 100a or the second region 100b. An armature (not pictured) disposed in recess 120 will slide through said recess 120 in an attempt to bridge the third region 1000 and thereby reduce the saturation of the third region 1000. By controlling the electric current applied to the solenoid, therefore, one is able to control the movement of the armature. In combination with external components, such as springs, valves, and the like, a user is able to use applied electric current to produce efficient mechanical control over a system.

Figure 2:
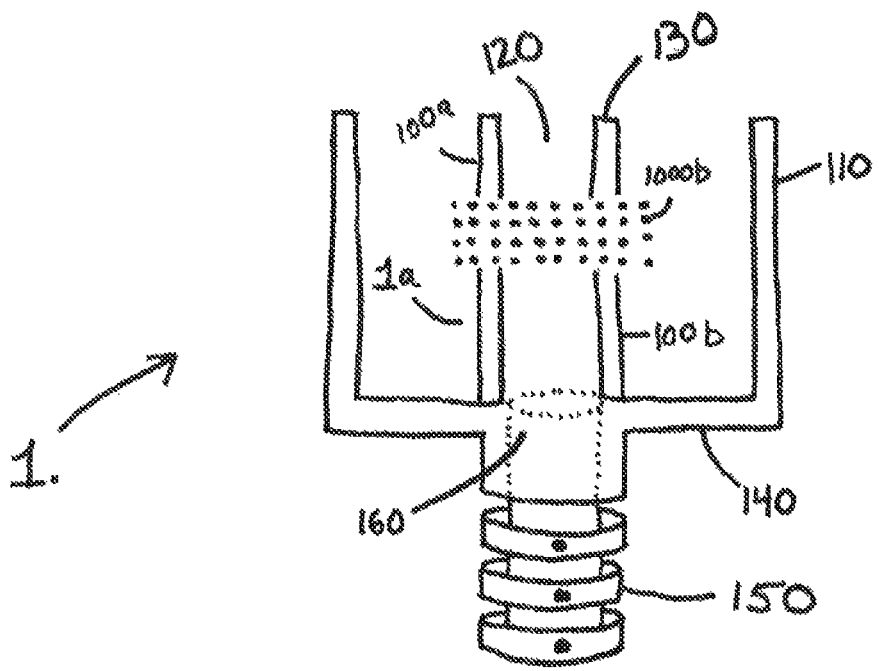
FIG. 2 depicts a further embodiment of the solenoid housing with an elongated center pole as shown in FIG. 1.

FIG. 2 displays an embodiment of a solenoid housing 1 of the instant invention in which the solenoid housing is further coupled with a spool and sleeve valve 150 comprising another recess 160. In this embodiment, the recesses 120 and 160 are a single bore through a first end 130, first region 100a, perforated region 1000b, second region 100b, second end 140, and valve 150. It is through this single bore that an armature (not pictured) will actuate in response to an applied electrical current. In one embodiment, the recesses 120 and 160 are proximate each other, and are either contiguous or non-contiguous. In a further embodiment, the third region approximates an air gap as may be found in the prior art by providing a perforated region 1000b which comprises at least one perforation. In one embodiment the at least one perforation is a series of perforations. In another embodiment, said series of perforations are distributed throughout the entire perimeter of the perforated region 1000b.

Figure 3:
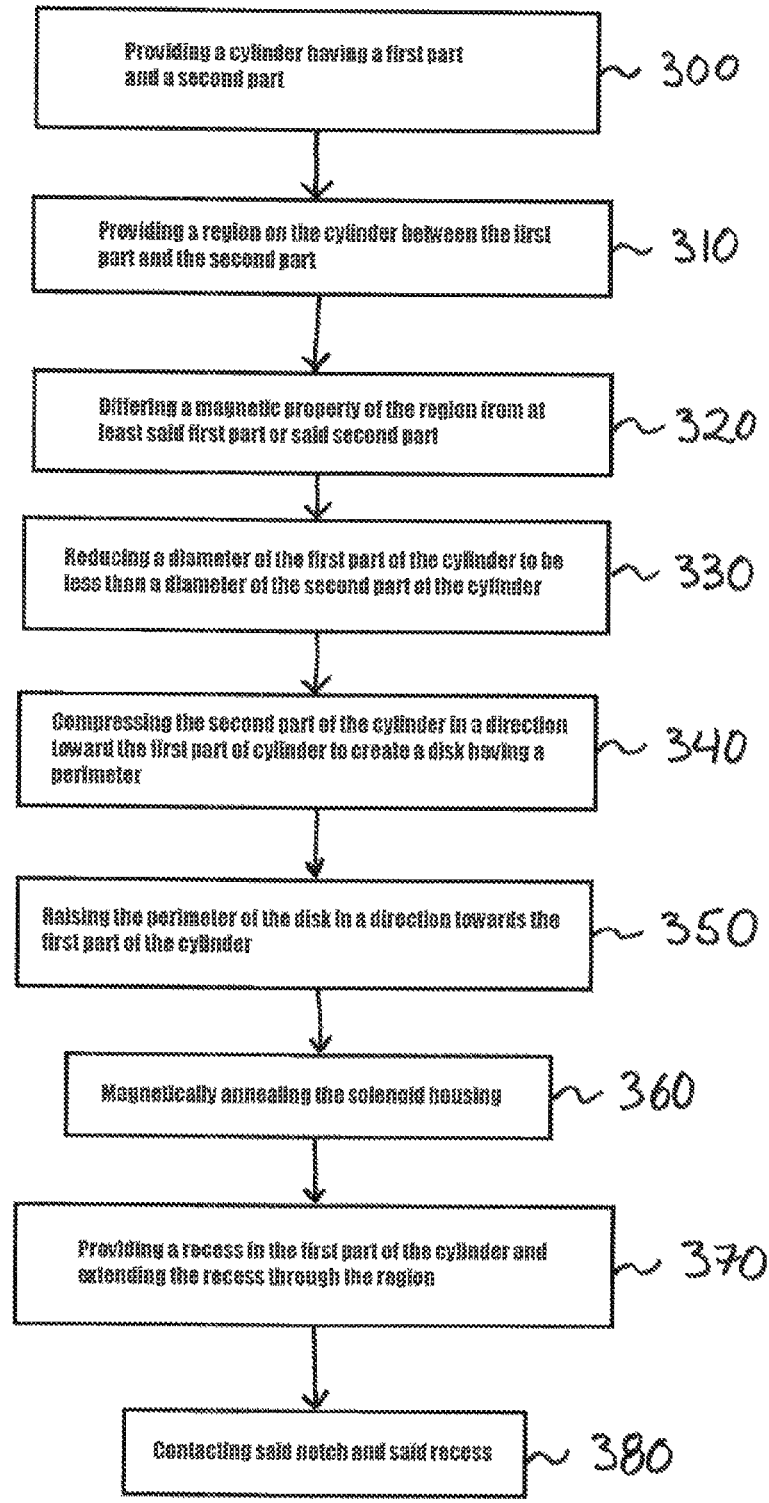
FIG. 3 depicts a method of making the solenoid housing with an elongated center pole as shown in FIG. 1.
Figure 4:
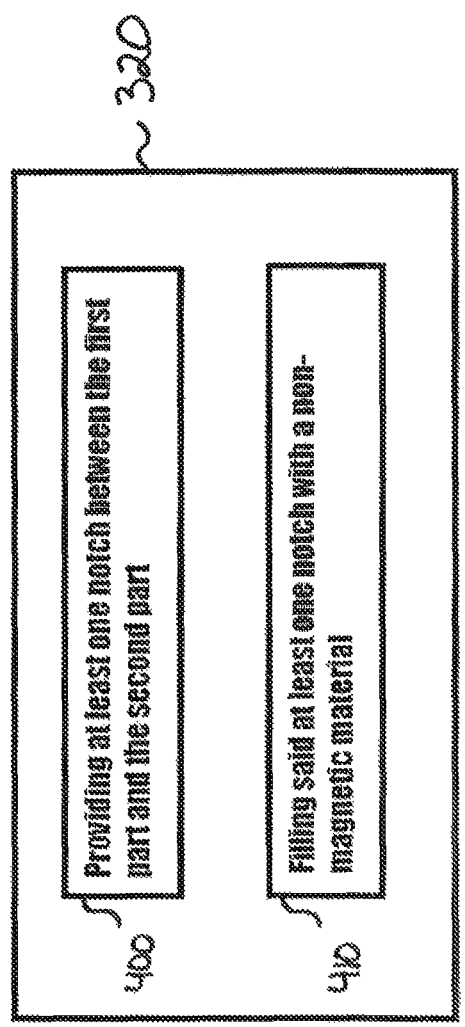
FIG. 4 depicts another embodiment of the method in FIG. 3, comprising steps of differing a magnetic property of a region on the solenoid housing.
Figure 5:
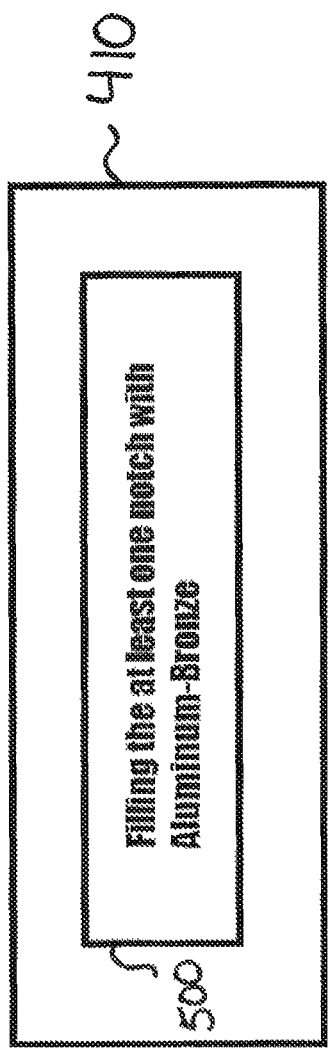
FIG. 5 depicts another embodiment of the method in FIG. 4, comprising steps of filling at least one notch with Aluminum-Bronze.
Figure 6:
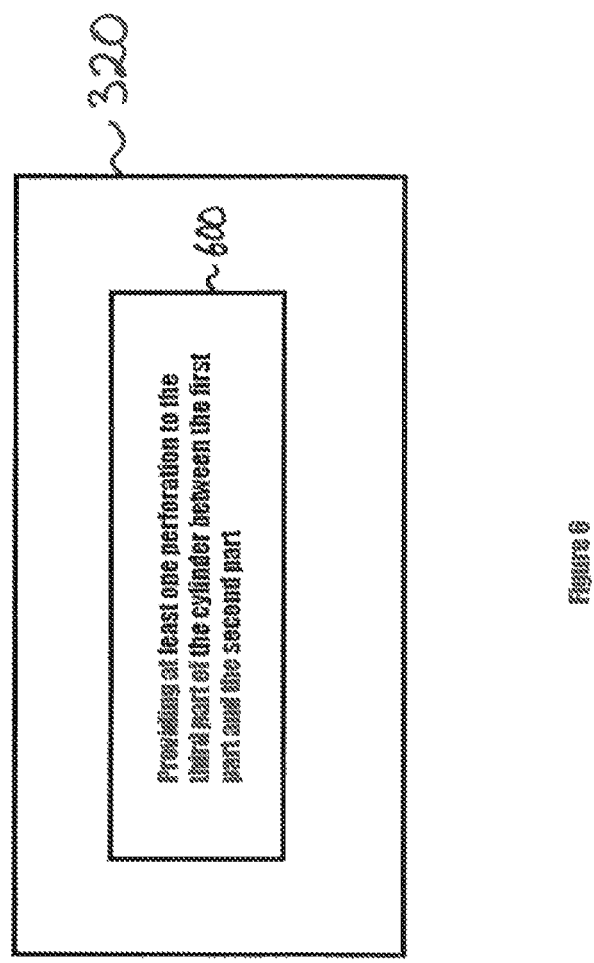
FIG. 6 depicts an additional embodiment of the method in FIG. 3, comprising steps of differing a magnetic property of a region on the solenoid housing.
Figure 7:
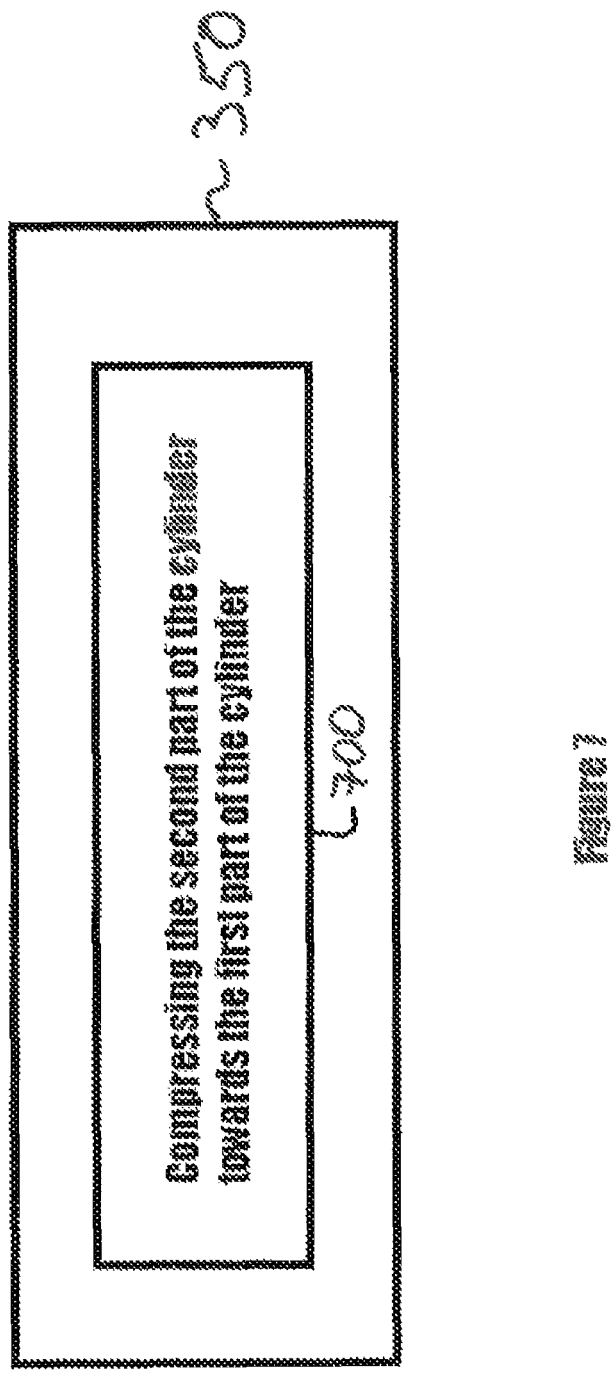
FIG. 7 depicts an embodiment of the method in FIG. 3, comprising steps of raising the perimeter of the disk in a direction towards the first part of the cylinder.

FIG. 3 displays a method 3 of making a solenoid housing consistent with the instant invention and as described above. The method 3 begins by providing 300 a cylinder of material having a first part and a second part and providing 310 a region between said first part and second part. In one embodiment, the material that is provided is a malleable material, allowing for the solenoid housing to be fabricated through a series of press forming or cold-forging steps. Cold-forging of the solenoid housing is vital to providing a highly durable and magnetically efficient product. As a cold-forged product, the center pole, outer cup or housing, and any complementary valve assembly are all integrally fashioned without any additional welding or crimping steps. In one embodiment, the first part and non-magnetic region are integral as well, such as when the non-magnetic region is provided through a series of perforations in the center pole.

In one embodiment, method 3 further comprises the step of differing 320 a magnetic property of the region from said first part or said second part. In a further embodiment, this is performed by providing 10 a region with a higher reluctance than either the first part or the second part. In one embodiment, this is performed by providing the region with at least one perforation (see 600 in FIG. 6). In another embodiment as portrayed in FIG. 4, this is performed by providing 400 at least one notch between the first part and the second part and filling 410 said at least one notch with a non-magnetic material. In a further embodiment, the differing step 320 comprises filling 500 the at least one notch with Aluminum-Bronze (see FIG. 5). The Aluminum Bronze, or any suitable non-magnetic material applied as part of step 410, can be applied to the notch by any suitable method, such as brazing. In one embodiment, the notch is provided as a cold-forging step. Cold-forging the notch allows for more precise control over the shape of the notch via the various dies used in the process, leading to a more reproducible and consistent product. In a further embodiment, the notch is v-shaped.

The second part of the cylinder is then compressed 320 towards the first part of the cylinder. Compression step 340 provides a disk having a perimeter at either the first or the second part of the cylinder. In one embodiment, method 3 further comprises the step of reducing 330 the diameter of the first part. The perimeter of the disk is then raised 350 towards the opposite end of the cylinder. In one embodiment, the byproduct of raising step 350 is a raised perimeter that is concentric with the first part and the second part. In another embodiment, the raised perimeter is raised to a height approximately equal to the height of the first part. This arrangement will allow a single "cap" piece to seal off the solenoid housing at either the first or the second part. In one embodiment, said cap piece is provided by crimping the raised perimeter and the cap piece together. In another embodiment, the cap piece is a washer with a recess allowing other components to access the recesses of the solenoid housing or valve assembly. In another embodiment, the raising step 350 is performed by compressing 700 the second part of the cylinder towards the first part of the cylinder (see FIG. 7).

In a further embodiment of method 3, the method comprises the step of providing 370 a recess in the first part of the cylinder and extending the recess through the region. The recess will provide the path along which the armature will actuate in response to an applied electric current. In a further embodiment, method 3 comprises the step of contacting 380 said notch and said recess. By contacting the notch with the recess, the center pole is provided with a region that approximates an air gap. The magnetic material of the solenoid housing is effectively stripped away from the notch, such that the magnetic field in the solenoid housing only interact with non-magnetic material when in the notch. In this way, the notch is essentially functionally indistinguishable from an air gap while retaining the structural strength and alignment of a continuous center pole.

In one embodiment, the method 3 further comprises the step of magnetically annealing 360 the solenoid housing. As mentioned above, in one embodiment, magnetically annealing the solenoid housing requires that the solenoid housing be heated to temperatures above the Curie temperature of the material, as high as approximately 800 degrees Celsius or more. With a melting point of approximately 1,200 degrees Celsius, Aluminum Bronze allows for fabrication of the notch before the magnetic annealing step and eliminates any worry of melting or distorting the notch during said annealing step. This scheme simplifies the fabrication process, as is discussed below.

Figure 8:
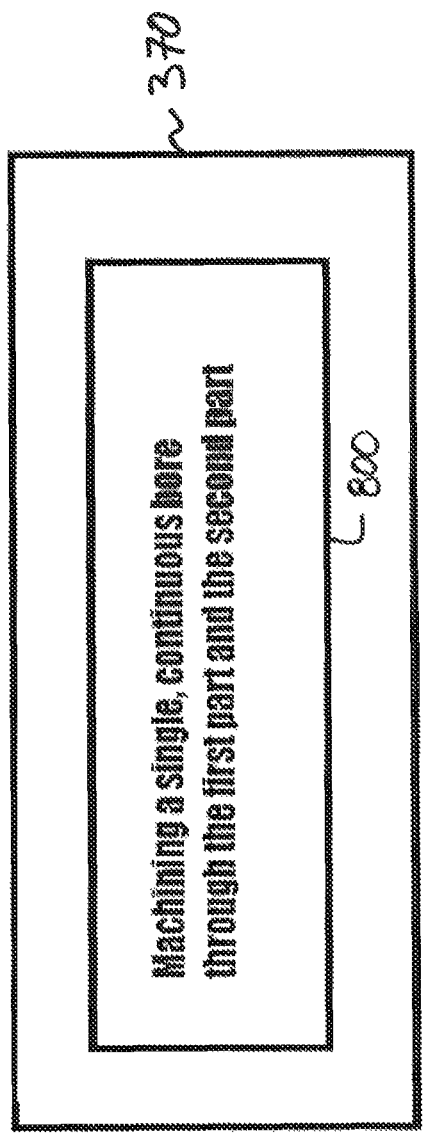
FIG. 8 depicts an embodiment of the method in FIG. 3, comprising steps of providing a recess in the first part of the cylinder and extending the recess through the region.

In a further embodiment, the step of providing 370 a recess in the first part of the cylinder and extending the recess through the region further comprises the step of machining 800 a single, continuous bore through the first part and the second part (see FIG. 8). Said machining step 800 provides a cylindrical cavity in the center pole of the solenoid housing, becoming the path along which the armature will actuate in response to an applied electric field. By providing a single, continuous bore while simultaneously contacting the notch and the recess, the center pole of the solenoid housing provides an uninterrupted and undisrupted path along which the armature actuates. The notch becomes, in essence, the wall of the center pole, structurally no different from either the first part or the second part. In embodiments where the notch is cold-forged, the machining step essentially separates the first part from the second part for the first time, as the first part and the second part are no longer contiguous, separated by the notch of non-magnetic material. As the magnetic properties of the first part and the second part remain the same, only the magnetic properties of the notch differentiate it from the remainder of the center pole. In the prior art solenoid housings with the two-piece center pole constructions, improper alignment caused friction between moving components. In the instant invention, the notch (with non-magnetic material) and recess meet at the outer diameter of the recess. There is no need for an alignment step as machining step 800 already provides from proper alignment of the first part, second part, and notch. All components of the solenoid housing can therefore be fabricated to more exacting specifications. Solenoid housings are designed, therefore, wherein the diameter of the armature is mere micrometers smaller than the diameter of the recess through which it will actuate. Such exacting specifications will decrease performance variation across the product solenoids produced by this method, while simultaneously allowing for longer operation lifetimes.

Figure 9:
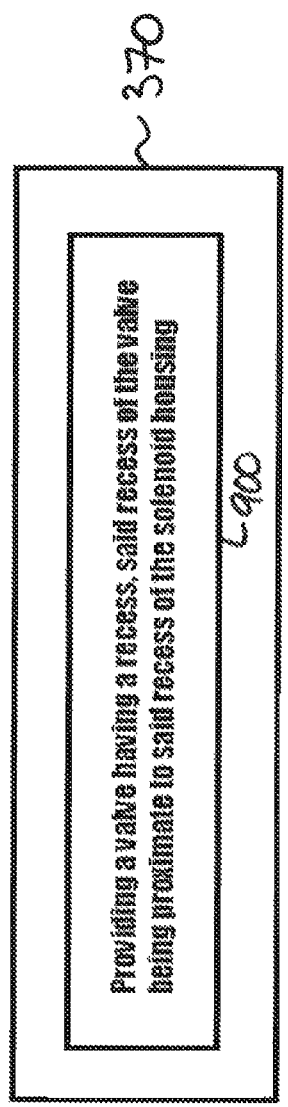
FIG. 9 depicts an additional embodiment of the method in FIG. 3, comprising steps of providing a recess in the first part of the cylinder and extending the recess through the region.
Figure 10:
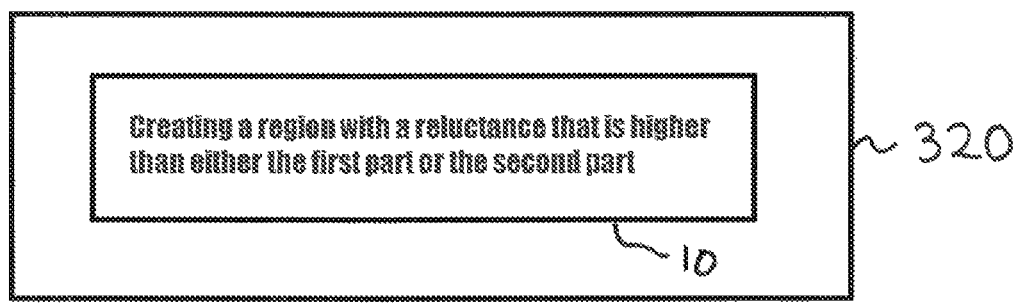
FIG. 10 depicts yet another embodiment of the method in FIG. 3, comprising steps of differing a magnetic property of a region on the solenoid housing.

In a further embodiment, the step of providing 370 a recess in the first part of the cylinder and extending the recess through the region further comprises the step of providing 900 a valve having a recess, said recess of the valve being proximate to the said recess of the solenoid housing (see FIG. 9). In a further embodiment, the first part, second part, non-magnetic region, and complementary valve are all aligned such that an armature freely slides between all components via the various recesses. In another embodiment, the valve recess is also a part of the smooth, continuous bore provided by machining step 800. In this embodiment, the armature is used to operate, for example, a spool and sleeve valve for controlling fluid flow. As was described above, the single continuous bore allows for proper alignment of all solenoid housing components, including the first part, second part, non-magnetic region, and now the spool and sleeve valve. Proper alignment leads to more precise fitting of components, meaning decreased performance variation and increased operational longevity.

Figure 11:
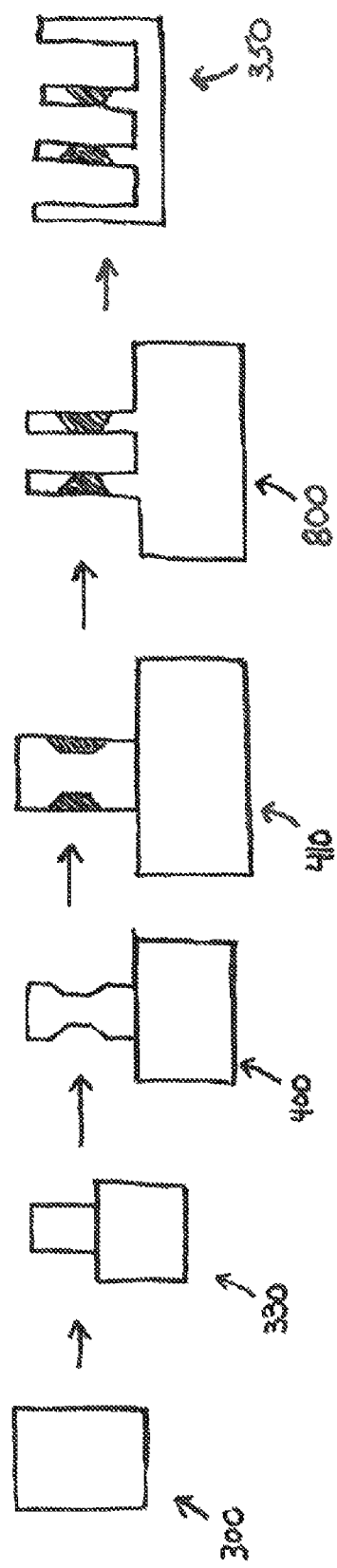
FIG. 11 depicts pictorially an embodiment of the method of making a solenoid with an elongated center pole as shown in FIG. 3.

FIG. 11 pictorially displays an embodiment of the method 3 of producing a solenoid housing of the instant invention, wherein the solenoid housing is provided via cold-forging. In this embodiment, a cylinder of material is provided consistent with method step 300 and the cylinder is composed of malleable material. Through a cold-forging step using the proper dies, the cylinder is shaped to reduce the diameter of the first part to be less than the diameter of the second part, consistent with method step 330. A notch is then cold-forged between the first part and the second part, consistent with method step 400 and filled with a non-magnetic material in a step consistent with method step 410. In one embodiment, this non-magnetic material is Aluminum-Bronze. A recess is then provided consistent with method step 800. As is evident from FIG. 11, the recess effectively separates the first part of the cylinder from the second part of the cylinder and provides a single, smooth, continuous bore through which an armature will later actuate. A perimeter is then raised, consistent with method step 350, which provides the outer cup or shell of the solenoid housing. In one embodiment, a valve is further added at either the first part or the second part, said valve having a recess proximate to the recess in the solenoid housing. In a further embodiment, the valve recess is part of the single, smooth, continuous bore of the solenoid housing recess.

While the present invention has been particularly described, it is evident that many alternatives, modifications and variations will be apparent to those skilled in the art in light of the foregoing description. It is therefore contemplated that the appended claims will embrace any such alternatives, modifications, and variations as falling within the true scope and spirit of the present invention.

What is claimed is:

1. A solenoid housing, comprising:
a center pole having a first diameter, a first region, a second region, and a third region between said first region and said second region; a center pole recess extending through at least a portion of the first region; a portion of the second region, and through all of the third region; said third region of said center pole is made of a first material having a first magnetic property; at least said first region or said second region is made of a second material having a second magnetic property, said first magnetic property being different from said second magnetic property, and a raised wall having an inner diameter and an outer diameter, wherein both said inner diameter and outer diameter are greater than said first diameter.

2. The solenoid housing of claim 1, wherein the third region comprises Aluminum-bronze.

3. The solenoid housing of claim 1, wherein the third region is perforated.

4. The solenoid housing of claim 1, further comprising a valve having a valve recess, said valve recess being proximate to the center pole recess.

5. A method of providing a solenoid housing comprising the steps of:
providing a cylinder having a first part and a second part;
providing a region on the cylinder between the first part and the second part; differing a magnetic property of the region from at least said first part or said second part;
compressing the second part of the cylinder in a direction toward the first part of cylinder to create a disk having a perimeter; raising the perimeter of the disk in a direction towards the first part of the cylinder; and providing a recess in the first part of the cylinder and extending the recess through the region.

6. The method of making a solenoid housing of claim 5, further comprising the step of reducing a diameter of the first part of the cylinder to be less than a diameter of the second part of the cylinder.

7. The method of making a solenoid housing of claim 5, wherein the step of providing a region having a magnetic property different from at least said first part or said second part comprises the step of providing at least one notch between the first part and the second part and filling said at least one notch with a non-magnetic material.

8. The method of making a solenoid housing of claim 7, further comprising the step of filling the at least one notch with Aluminum-Bronze.

9. The method of making a solenoid housing of claim 7, further comprising the step of contacting said notch and said recess.

10. The method of making a solenoid housing of claim 5, wherein the step of providing a region having a magnetic property different from at least said first part or said second part comprises the step of providing at least one perforation to the third part of the cylinder between the first part and the second part.

11. The method of making a solenoid housing of claim 5, further comprising the step of magnetically annealing the solenoid housing, wherein said step of magnetically annealing the solenoid housing occurs after the step of raising the perimeter of the disk in a direction towards the first part of the cylinder.

12. The method of making a solenoid housing of claim 5, wherein the step of raising the perimeter of the disk in a direction towards the first part of the cylinder is performed by compressing the second part of the cylinder towards the first part of the cylinder.

13. The method of making a solenoid housing of claim 5, further comprising the step of machining a single, continuous bore through the first part and the second part.

14. The method of making a solenoid housing of claim 13, further comprising the step of providing a valve having a recess, said recess of the valve being proximate to said recess of the solenoid housing.

15. A method of providing a solenoid housing comprising the steps of: providing a cylinder of malleable material having a first part and a second part; providing at least one notch having a depth, the notch being between the first part and the second part; filling said at least one notch with a non-magnetic material; compressing the second part of the cylinder in a direction toward the first part of cylinder to create a disk having a perimeter; raising the perimeter of the disk in a direction towards the first part of the cylinder; extending a recess in the first part of the cylinder through said first part and said second part; and contacting said at least one notch with said recess.

16. The method of claim 15, further comprising the step of reducing a diameter of the first part of the cylinder to be less than a diameter of the second part of the cylinder.

17. The method of claim 15, further comprising the step of magnetically annealing the solenoid housing after the step of raising the perimeter of the disk in a direction towards the first part of the cylinder.

18. The method of claim 15, wherein the step of filling said at least one notch with non-magnetic material comprises the step of creating a region with a reluctance that is higher than either the first part or the second part.

19. The method of claim 15, further comprising the step of providing a valve having a recess: said recess of the valve being proximate to said recess of the solenoid housing.

* * * * *